UNITED STATES PATENT OFFICE.

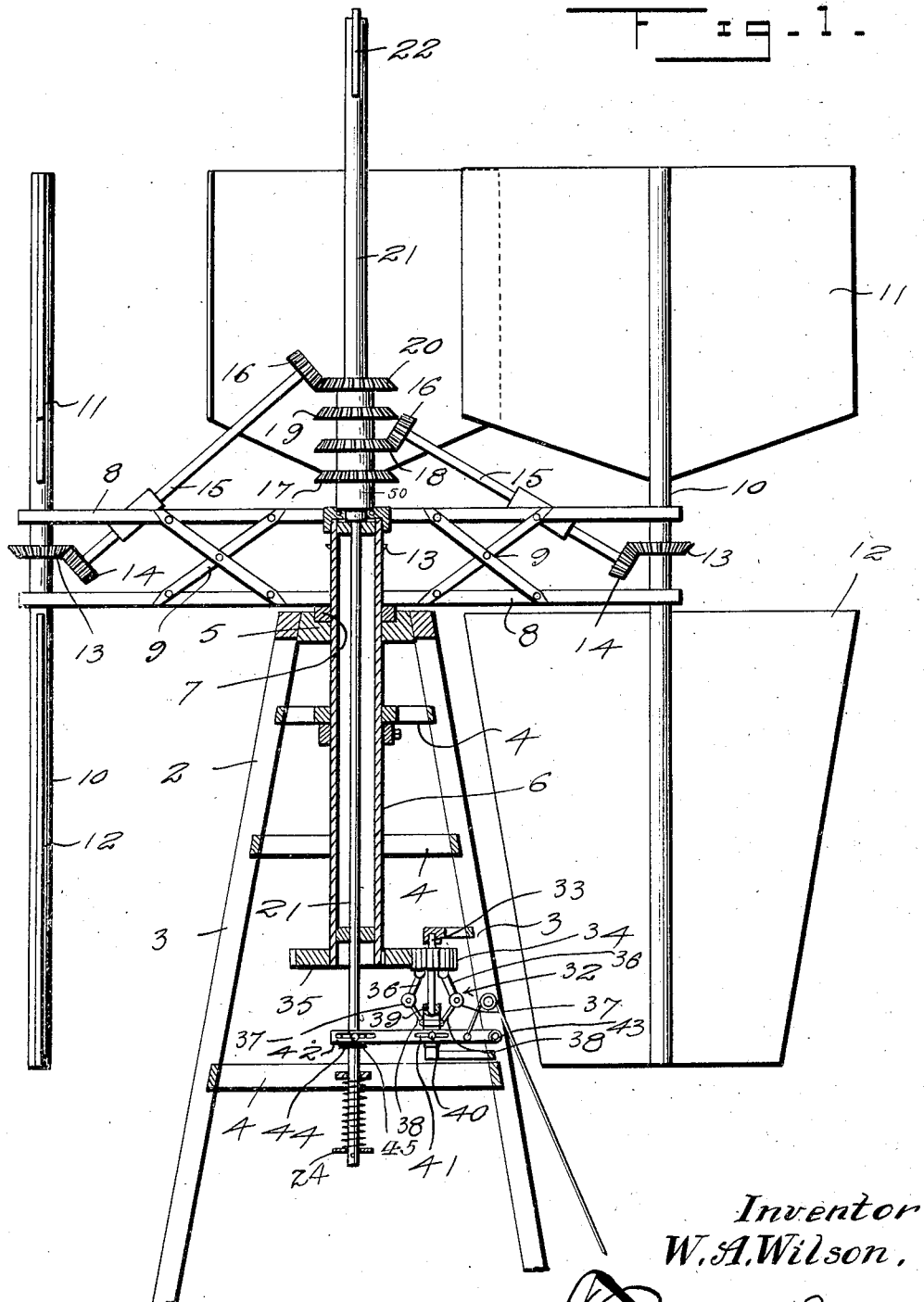

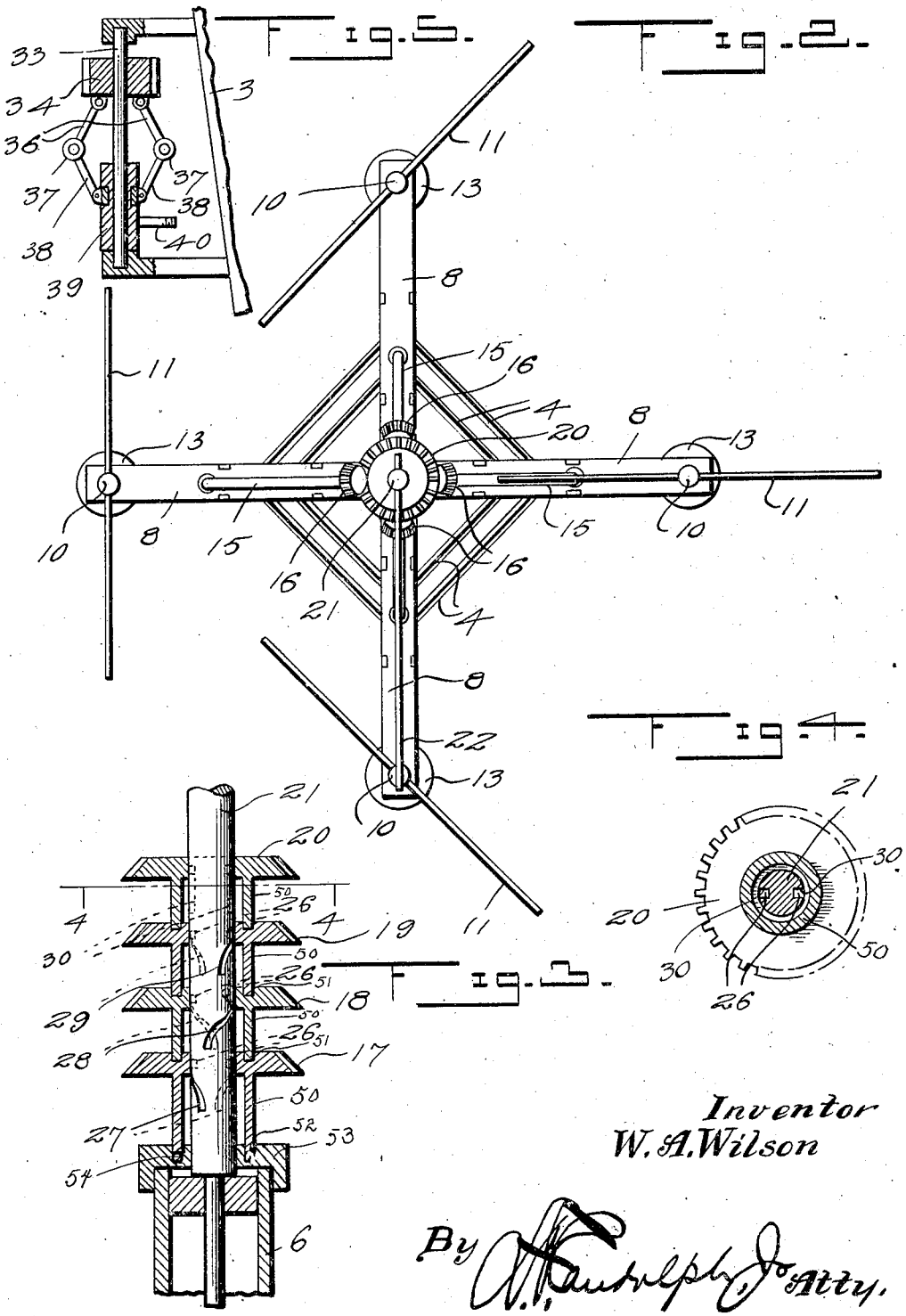

WALTER A. WILSON, OF ELKHART, KANSAS.

WINDMILL.

1,352,859.  Specification of Letters Patent.  Patented Sept. 14, 1920.

Application filed April 15, 1919. Serial No. 290,221.

*To all whom it may concern:*

Be it known that I, WALTER A. WILSON, a citizen of the United States, residing at Elkhart, in the county of Morton and State of Kansas, have invented certain new and useful Improvements in Windmills; and I do hereby declare the following to be a full, clear, and exact description of the invention, such as will enable others skilled in the art to which it appertains to make and use the same.

My invention relates to wind mills and has as its principal object the provision of a windmill wherein the rotating blades are disposed parallel to the range of the wind and are so mounted as to feather after passing out of the range of the wind so that a minimum resistance will be offered upon the approach of the blades toward the wind.

Another object of the invention is to provide an improved wind mill in which the weight is evenly distributed about a central supporting axis, so as to provide a well balanced construction.

A further object of the invention is to provide an improved mill in which the vanes are arranged to be brought parallel to the wind and to the tail vane, so as to effectively stop the operation of the mill during a high wind or if it is desired to stop the machinery operated by the mill.

A further object of the invention is to provide an improved mill of the above character which is adapted to be built on the ordinary tower thus requiring a non-expensive structure to support the same.

Another object of the invention is to provide an improved means for automatically governing the rotation of the wind wheel, so that the uniform speed may be had during low and high winds.

A still further object of the invention is to provide an improved wind mill of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a central vertical section through the mill,

Fig. 2 is a top plan view of the same,

Fig. 3 is a detail sectional view showing the means for bringing the vanes parallel to each other and to the wind, Fig. 4 is a detail horizontal section taken on the line 4—4 of Fig. 3, and Fig. 5 is a detail section through the governor for controlling the speed of the mill.

Referring to the drawings in detail, wherein similar reference characters designate corresponding parts throughout the several views, the numeral 1 generally indicates the improved wind mill, which includes a tower 2 of the ordinary or any preferred construction, which as shown includes the upwardly extending converged posts 3 provided with cross bars 4 which serve to suitably brace the structure. The upper terminals of the posts 3 support the boxing 5, which rotatably receives the hollow shaft 6 having a collar 7 formed thereon, which engages the upper end of the boxing to limit the downward movement of the shaft. Secured to the shaft and extending radially therefrom and at right angles to each other are superimposed pairs of arms 8, which are suitably braced as at 9 to present a rigid structure. The outer terminals of the arms 8 are provided with bearings which rotatably receive the vertical shafts 10 which extend above and below the arms 8 and are provided with upper and lower vanes 11 and 12. The edges of the lower vane 12 are inclined downwardly so as to conform to the inclination of the tower 2. Each of the shafts 10 has keyed thereto intermediate the pairs of arms bevel gears 13, which have meshing therewith bevel gears 14 keyed to the inclined shafts 15 rotatably mounted on the upper arms 8. These shafts 15 extend inwardly from the shafts 10 and have keyed to the inner ends thereof bevel gears 16 which mesh with superimposed bevel gears 17, 18, 19 and 20 keyed to the inner shaft 21, which extends through the hollow shaft 6. The inner shaft 21 extends above the hollow shaft and has secured thereto the rudder 22 which forms means for turning the blades 8 and 12 to bring the same in correct position to the wind when the direction of the wind changes. Thus, it will be seen that an independent gear is provided for each of the shafts 10 for positioning the vanes 11 and 12 carried thereby. The vanes are so positioned with relation to each other, as clearly shown in Fig. 2, that while the vanes carried by one shaft are at right angles to the wind, the vanes on the opposite shaft are parallel with the wind, while the vanes on the other shafts are being brought into and out of right angles with the wind. As the vanes are being rotated around the tower, the same will be moved into and out of engagement with the wind through the medium of the gears 13, and 14, the shafts 15, and the gears 16, 17, 18, 19 and 20. A contractile coil spring is positioned around the lower end of the shaft 21, which protrudes below the outer hollow shaft 6 and the lower end of the same is secured to a collar 24, which is rotatably carried by the shaft. The upper end of the spring is secured to one of the braces 4 and this spring supports the shaft 21 in correct position.

To provide means for positioning the blades or vanes carried by each shaft parallel to each other and to the tail or rudder 15, the gears 17, 18, 19 and 20 are slidably mounted on the shaft 21 and each have inwardly extending lugs 26, which slidably fit in grooves 27, 28, 29 and 30 formed in the shaft 21. The upper groove 30 is formed substantially straight so that when the shaft 21 is raised, no movement will be imparted to the gear 20. The three lower grooves 27, 28 and 29 are cut spirally in the shaft and each have a different inclination, so that when the shaft is raised, the gears 17, 18 and 19 will be rotated through the medium of the lugs carried thereby a certain predetermined distance, which will in turn rotate the shafts 15 and thus rotate the shafts 10, which will position the vanes carried thereby in parallel relation to each other which will effectively prevent rotation of the blades around the tower. Each of the gears 17, 18, 19 and 20 have a downwardly extending tubular base 50, which rotatably fits in a groove 51 formed in the upper surface of the gears. The tubular base of the lowermost gear is received in a groove 52 formed in the upper surface of the cap 53 secured to the hollow shaft 6. The groove 52 is provided with ball bearings 54 so as to permit the shaft 6 to readily rotate without imparting movement to the gears.

A governor 32 is provided so that uniform speed of rotation may be imparted to the hollow shaft when winds of different velocity are blowing, and this governor includes the vertical shaft 33 suitably journaled in bearings carried by the posts 3 and this shaft has a gear 34 keyed thereto, which meshes with a relatively large gear 35 keyed to the lower end of the hollow shaft 6. The gear 34 has pivotally secured thereto downwardly extending arms 36 which have pivotally connected thereto weights or balls 37, which in turn have pivoted thereto downwardly extending arms 38, which are pivotally connected at their lower ends to a sleeve 39 slidably mounted on the shaft 33.

The lower end of the sleeve is provided with an outwardly extending pin 40 which is slidably mounted in a slot 41 formed intermediate the terminals of the lever 42, which has one end thereof pivotally connected as at 43 to one of the corner posts 3 and its opposite end pivotally connected as at 44 to a collar 45 rotatably mounted upon the inner shaft 21. Thus it will be seen that when the shaft 6 is rotated by the vanes 11 and 12 carried by the shafts 10, the weights will be thrown outwardly by centrifugal force and thus raise the lever 42, which will in turn raise the shaft 21 which will, through the medium of the lugs 26 and grooves 27, 28 and 29, rotate the bevel gears 17, 18 and 19 and thus vary the angle of the vanes with relation to each other, so as to vary the resistance thereof to the wind and thus decrease the speed of the mill.

From the foregoing description it can be seen that an improved wind mill is provided, in which a relatively large area of surface is provided for catching the wind, and which is so constructed, that the weight of the wheel is evenly distributed around the supporting structure.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. A wind mill comprising a supporting structure, a hollow shaft rotatably carried by the supporting structure, a second shaft mounted in the hollow shaft for independent movement, a rudder secured to the second shaft, a plurality of outwardly extending arms carried by the hollow shaft, a vertical shaft carried by each arm, vanes secured to the last mentioned shaft, bevel gears secured to the last mentioned shaft, a bevel gear secured to the second mentioned shaft for each one of said last mentioned shafts, means operatively connecting each one of the last mentioned bevel gears with the respective shafts carried by the arms, and means operated by the second mentioned shaft for moving the vanes in parallel relation to each other and to the rudder, as and for the purpose specified.

2. In a wind mill structure, a hollow shaft, a plurality of outwardly extending arms carried by the hollow shaft, an inner shaft carried by the tubular shaft for independent rotary and sliding movement, a vertical shaft carried by each arm, vanes mounted on the last mentioned vertical shaft, and means for varying the angle of the vanes to one another by the sliding movement of the inner shaft.

3. In a wind mill construction, a hollow shaft, a plurality of outwardly extending arms secured to the hollow shaft, a vertical shaft carried by each arm, an inner shaft rotatably and slidably carried by the outer hollow shaft, a plurality of gears secured to the inner shaft, means for operatively connecting the gears to the shaft carried by the vanes, means for raising and lowering the inner shaft, and means for rotating the gears carried by the inner shaft upon sliding movement thereof, as and for the purpose specified.

4. In a wind mill construction, a hollow shaft, a plurality of outwardly extending arms carried by the hollow shaft, a vertical shaft carried by each one of the arms, vanes carried by the last mentioned shaft, an inner shaft rotatably and slidably mounted in the hollow shaft, a plurality of gears carried by the inner shaft, means operatively connecting the gears with the shaft carried by the arms, means for raising and lowering the inner shaft, means for operatively connecting the inner shaft with the gears for causing a certain limited rotation upon movement of the shaft, and a governor connected to the inner sliding shaft to cause the same to raise and lower according to the velocity of the wind, as and for the purpose specified.

In testimony whereof I affix my signature in presence of two witnesses.

WALTER A. WILSON.

Witnesses:
  EARL TAYLOR,
  J. F. MAVARY.